Patented July 4, 1933

1,916,607

UNITED STATES PATENT OFFICE

WALTER DROSTE AND MAX WERNER, OF WIESDORF-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

WEATHER-RESISTANT COATING MATERIAL

No Drawing. Application filed February 13, 1930, Serial No. 428,237, and in Germany March 6, 1929.

The present invention relates to valuable, weather resistant paints, lacquers, pigments and other coating materials and to a process for preparing same.

It is a known fact that paints which only contain chemically indifferent pigments as, for instance, lithopone are not as weather resistant as paints containing the so-called basic pigments as, for instance, white lead and zinc oxide. This is due to the formation in the latter paints of metallic soaps by chemical interaction of the oxides of the basic pigments with the free or combined acids of the binding agents, such as for instance linseed oil.

We have now found that very valuable weather resistant paints, pastes of paints, lacquers, pigments and other coating materials are obtainable, when such a quantity of a basic pigment is added to the coating material as is about chemically equivalent to the acid content of the binding agent. The acids reacting with the basic pigments are not only the free fatty acids but also the glycerides thereof and the acids which are produced by chemical reaction in the paints or by chemical decomposition of the film of the binding agent under the influence of the atmosphere. The quantity of the basic pigment to be added is to be determined by an analysis. In each case it is advantageous to use, instead of such pigments as combine with the binding agents to soap only with moderate velocity or form soaps only when the film of the binding agent is already chemically decomposed by the atmosphere as is the case for instance with white lead or zinc white prepared by oxidation of metallic zinc, such basic pigments as combine rapidly with the binding agent without a decomposition of the binding agent by weathering being necessary. Basic pigments which fulfill the requirements of the invention in respect of a quickly commencing soap formation are, for instance, lead oxide, minium, zinc hydroxide and zinc oxide precipitated and dried at a temperature not exceeding 500° C. As binding agents the usual drying oils, as nut oil, poppy-seed oil, linseed oil, wood oil can be used.

According to another feature of our invention it is also possible to prepare valuable paints containing basic pigments by putting a basic pigment into a paint with such a quantity of a binding agent as, for example, linseed oil, wood oil and the like that the quantity of base is just sufficient to convert the acids of the binding agent into soaps, for it has been found that the paints lose considerably in extensibility, toughness and resistivity, when the basic substances are present in such quantities that after the fixation of the fatty acids an excess of basic pigments remains present. Thus the surprising effect is observed that paints and so on which contain only basic pigments can be improved as regards stability and resistivity to weather by the addition of substances which are indifferent towards the customary binding agents. In every case there is an optimum mixture of indifferent and basic pigments and binding agent containing approximately just such a quantity of pigment as is necessary for the conversion of the combined and free fatty acids in the binding agent into soaps.

The invention is illustrated by the following examples, without being limited thereto; the parts being by weight.

*Example 1.*—100 parts of white lead are mixed with 5 parts of titanium white and made into a paint with 39 parts of linseed oil.

*Example 2.*—25 parts of zinc oxide which has been precipitated and dried at a temperature not exceeding 500° C., are added to 100 parts of lithopone. This mixture is made into a paint with 45 parts of linseed oil.

*Example 3.*—30 kg. of titanium white, 14 kg. of ochre, 2 kg. of lamp black are mixed with 24 kg. of lead oxide, the mixture is made into a paint with 30 kg. of linseed oil, 1 litre of turpentine oil or benzene for varnishes and 0.6 kg. of cobalt linoleate. The paint thus obtained is distinguished by a particularly high resistivity to weather.

The expression "acid content" used in the claims is intended to include the free acids present in the binding agent and the acids bound in glycerides and acids which will be formed in the film of the binding agent by chemical decomposition.

We claim:

1. Coating materials being composed of a drying oil, lithopone and such a quantity of zinc oxide which has been precipitated and dried at a temperature not exceeding 500° C. as is just sufficient to neutralize the acid content of the binding agent.

2. A paint being composed of 100 parts of lithopone, 25 parts of zinc oxide which has been precipitated and dried at a temperature not exceeding 500° C. and 45 parts of linseed oil.

3. Process for producing new valuable weather-resistant coating materials which comprises incorporating into a coating material comprising a drying oil such a quantity of a basic pigment as is just sufficient to neutralize the acid content of the binding agent.

4. Coating materials comprising a drying oil and such a quantity of a basic pigment as is just sufficient to neutralize the acid content of the binding agent.

5. Coating materials comprising a drying oil, at least one indifferent pigment and such a quantity of a basic pigment as is just sufficient to neutralize the acid content of the binding agent.

In testimony whereof, we affix our signatures.

WALTER DROSTE.
MAX WERNER.